United States Patent
Rothstein

(10) Patent No.: US 9,153,153 B1
(45) Date of Patent: Oct. 6, 2015

(54) ADVERTISING CYCLING DEVICE

(71) Applicant: Gene A. Rothstein, Cocoa, FL (US)

(72) Inventor: Gene A. Rothstein, Cocoa, FL (US)

( * ) Notice: Subject to any disclaimer, the term of this patent is extended or adjusted under 35 U.S.C. 154(b) by 0 days.

(21) Appl. No.: 14/180,014

(22) Filed: Feb. 13, 2014

(51) Int. Cl.
  *G09F 21/00* (2006.01)
  *G09F 21/04* (2006.01)
  *B62M 1/36* (2013.01)

(52) U.S. Cl.
  CPC .............. *G09F 21/048* (2013.01); *B62M 1/36* (2013.01)

(58) Field of Classification Search
  CPC ........ G09F 21/00; G09F 21/048; B60J 6/001; B60J 2099/0026; B60J 2099/0033; B60J 99/00; B62K 5/02
  See application file for complete search history.

(56) References Cited

U.S. PATENT DOCUMENTS

| | | | |
|---|---|---|---|
| 623,865 A * | 4/1899 | Ayer ................................ 40/517 |
| 3,586,348 A * | 6/1971 | Rich, Jr. ...................... 280/304.4 |
| 4,115,942 A * | 9/1978 | Sears .............................. 40/547 |
| 4,277,078 A | 7/1981 | Root |
| 4,373,740 A | 2/1983 | Hendrix |
| 4,386,675 A * | 6/1983 | Landon ......................... 180/221 |
| 5,468,006 A * | 11/1995 | Delserro ....................... 280/202 |
| 5,950,342 A * | 9/1999 | Suesholtz ....................... 40/768 |
| D414,816 S | 10/1999 | Saunders |
| 2002/0067022 A1* | 6/2002 | Grove ......................... 280/288.4 |
| 2006/0197354 A1* | 9/2006 | Stigger ........................ 296/78.1 |
| 2007/0113449 A1* | 5/2007 | Sinchok .................... 40/607.06 |
| 2007/0152422 A1* | 7/2007 | Lin ............................... 280/275 |
| 2007/0205917 A1* | 9/2007 | Nickson et al. ............... 340/907 |
| 2009/0031600 A1 | 2/2009 | Anderson, II et al. |
| 2011/0115191 A1 | 5/2011 | VanLoozen |
| 2011/0198822 A1* | 8/2011 | Jessie, Jr. ..................... 280/278 |
| 2012/0019019 A1 | 1/2012 | Mredith |

* cited by examiner

*Primary Examiner* — Gary Hoge

(57) ABSTRACT

An advertising cycling device provides a mobile way for displaying advertisements. The device includes a cycling frame. A plurality of wheels is rotatably coupled to the cycling frame. A crankset is coupled to the cycling frame. The crankset includes a pair of pedals. The pedals are mechanically coupled to at least one of the wheels such that rotation of the pedals causes at least one of the wheels to rotate. An advertising frame is coupled to the cycling frame. A panel is selectively couplable to the advertising frame. The panel has advertisement indicia positioned thereon.

18 Claims, 4 Drawing Sheets

ADVERTISING CYCLING DEVICE

BACKGROUND OF THE DISCLOSURE

Field of the Disclosure

The disclosure relates to cycling devices and more particularly pertains to a new cycling device for providing a mobile way for displaying advertisements.

SUMMARY OF THE DISCLOSURE

An embodiment of the disclosure meets the needs presented above by generally comprising a cycling frame. A plurality of wheels is rotatably coupled to the cycling frame. A crankset is coupled to the cycling frame. The crankset includes a pair of pedals. The pedals are mechanically coupled to at least one of the wheels such that rotation of the pedals causes at least one of the wheels to rotate. An advertising frame is coupled to the cycling frame. A panel is selectively couplable to the advertising frame. The panel has advertisement indicia positioned thereon.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
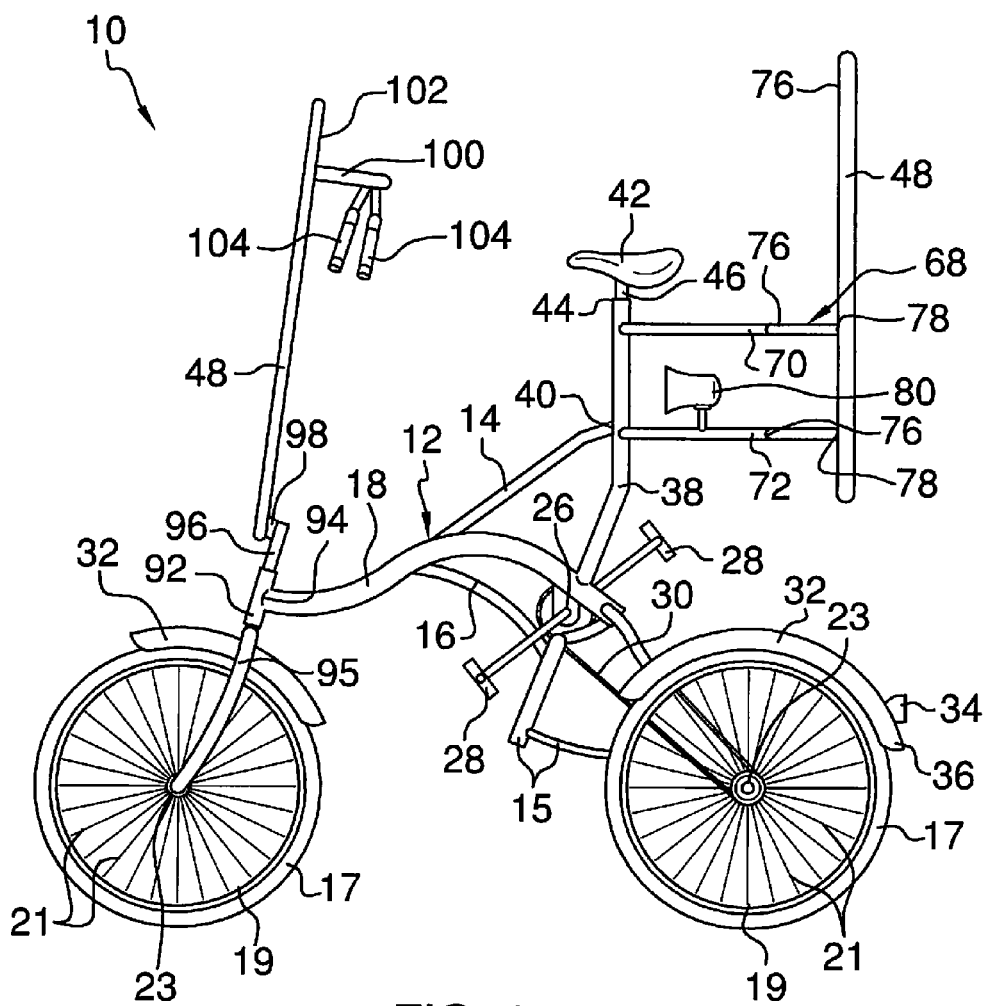
FIG. 1 is a side view of an advertising cycling device according to an embodiment of the disclosure.
Figure 2:
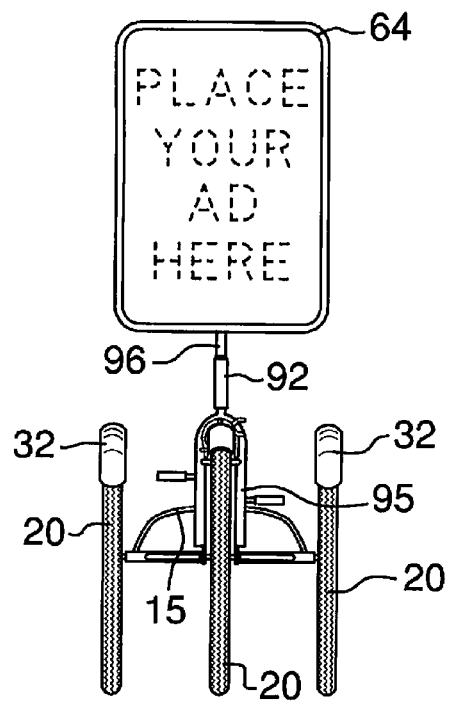
FIG. 2 is a front view of an embodiment of the disclosure.
Figure 3:
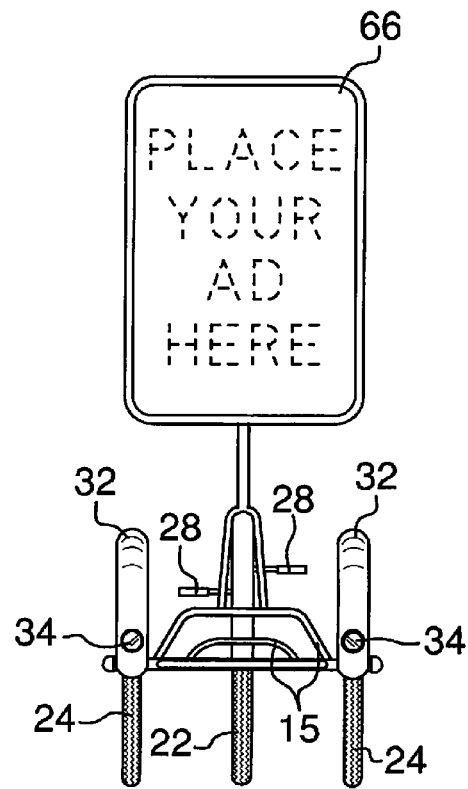
FIG. 3 is a back view of an embodiment of the disclosure.
Figure 4:
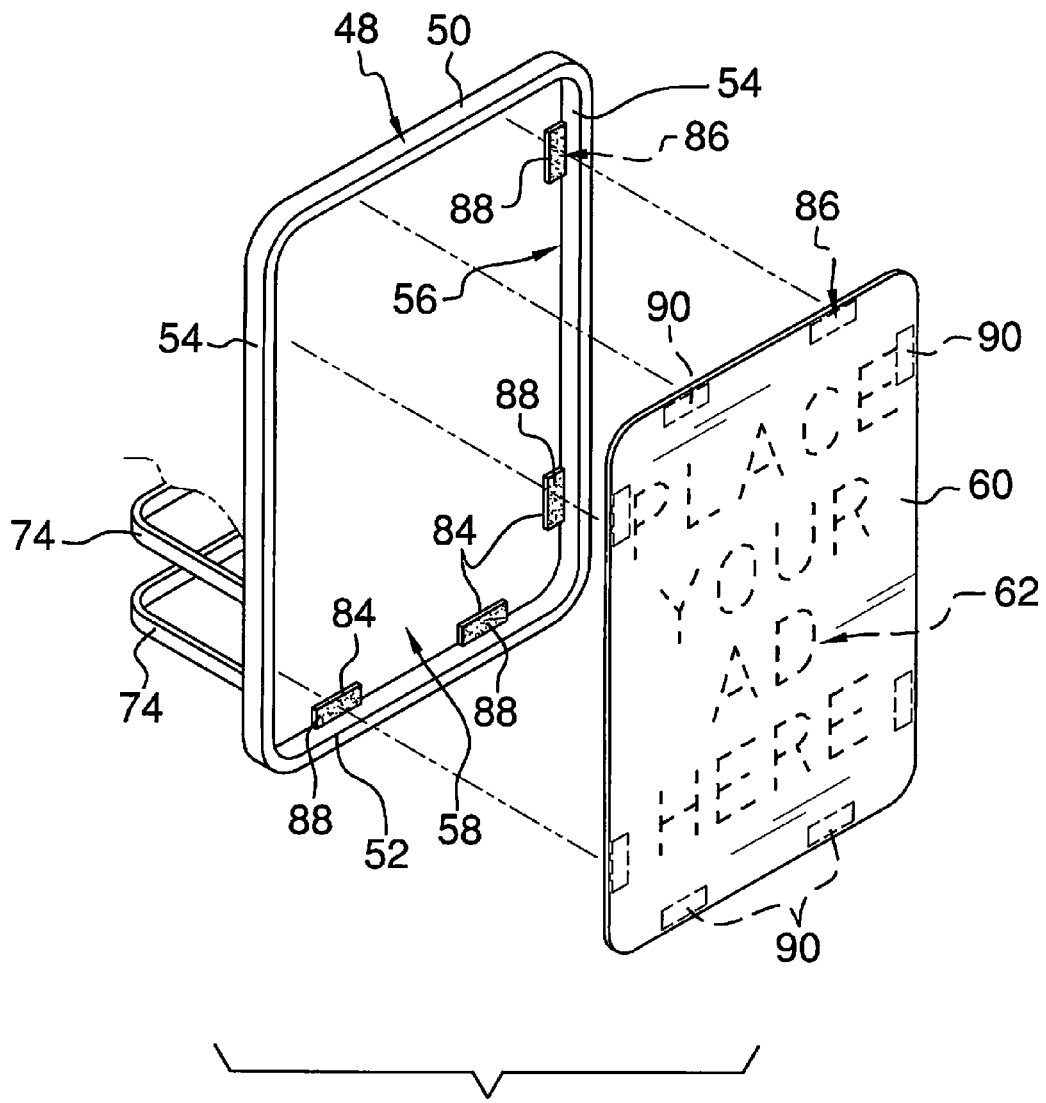
FIG. 4 is an exploded front perspective view of an advertising frame and a panel of an embodiment of the disclosure.

With reference now to the drawings, and in particular to FIGS. 1 through 5 thereof, a new cycling device embodying the principles and concepts of an embodiment of the disclosure and generally designated by the reference numeral 10 will be described.

As best illustrated in FIGS. 1 through 5, the advertising cycling device 10 generally comprises a cycling frame 12 including a top tube 14, a down tube 16 and a mid tube 18. The top tube 14 is coupled to and extends upwardly away from the mid tube 18. The down tube 16 is coupled to and extends downwardly away from the mid tube 18. The frame 12 may be constructed from aluminum or other similar material conventionally used to construct bicycle frames. The cycling frame 12 may also include a plurality of supplementary tubes 15 wherein one of the supplementary tubes 15 is coupled to the down tube 16 and each of the supplementary tubes is coupled to an adjacently positioned one of the supplementary tubes 15.

A plurality of wheels 20 is rotatably coupled to the cycling frame 12. The plurality of wheels 20 may comprise exactly three wheels 20 wherein the plurality of wheels 20 includes a front wheel 22 and a pair of rear wheels 24. Each of the wheels 20 is generally conventional and includes a tire 17, a rim 19, a plurality of spokes 21 and a central hub 23. A crankset 26 is coupled to the cycling frame 12. The crankset 26 includes a pair of pedals 28. The pedals 28 are mechanically coupled to the rear wheels 24 such that rotation of the pedals 28 causes the rear wheels 24 to rotate. A chain 30 is coupled to the crankset 26. The chain 30 is mechanically coupled to each of the rear wheels 24 such that rotation of the chain 30 about the crankset 26 causes the rear wheels 24 to rotate. A plurality of fenders 32 is provided. Each of the fenders 32 is coupled to an associated one of the wheels 20. Each of the fenders 32 of the rear wheels 24 has a safety reflector 34 positioned thereon. Each of the safety reflectors 34 may be positioned proximate a back end 36 of the associated fender 32.

A seat tube 38 is coupled to and extends upwardly from the mid tube 18. A distal end 40 of the top tube 14 with respect to the mid tube 18 is coupled to the seat tube 38. A seat 42 is coupled to a top end 44 of the seat tube 38. A height-adjustable tube 46 is coupled to the seat tube 38. The height-adjustable tube 46 is positioned within an interior of the seat tube 38 and is coupled to the seat 42. The height-adjustable tube 46 is configured to permit adjustment of a height of the seat 42 relative to the seat tube 38. The seat tube 38 may include a straight upper portion and an angled lower portion. The angled lower portion may attach to the mid tube 18. The straight upper portion is positioned rearwardly of the crankset 26 at a distance between approximately 10.0 centimeters and 30.0 centimeters behind the crankset 26.

An advertising frame 48 is coupled to the cycling frame 12. The advertising frame 48 includes a top section 50, a bottom section 52 and a pair of side sections 54 coupled to and extending between the top section 50 and the bottom section 52. An inner perimeter edge 56 of the advertising frame 48 defines a central opening 58 positioned in the advertising frame 48. A panel 60 is selectively couplable to the advertising frame 48. In particular, the panel 60 is positionable within the opening 58 to cover the opening 58. The panel 60 has advertisement indicia 62 positioned thereon. The advertising frame 48 may be one of a pair of advertising frames 48 and include a front advertising frame 64 positioned above the front wheel 22 and a rear advertising frame 66 positioned above the rear wheels 24. The panel 60 may also be one of a pair of panels 60 such that one of the panels 60 is selectively couplable to the front advertising frame 64 and one of the panels 60 is selectively couplable to the rear advertising frame 66. Each panel 60 is positionable within an associated one of the openings 58 to cover the associated opening 58. Each of the advertising frames 64, 66 may have a length between approximately 70.0 centimeters and 150.0 centimeters and a width between approximately 40.0 centimeters and 80.0 centimeters.

An advertising support assembly 68 couples the seat tube 38 to the rear advertising frame 66. The advertising support assembly 68 comprises an upper post 70, a lower post 72 and a pair of arcuate support members 74. Each of the upper 70 and lower 72 posts is coupled to and extends rearwardly from the seat tube 38. The upper 70 and lower 72 posts are positioned in spaced parallel relationship relative to each other.

Each of the arcuate support members 74 has a first end 76 coupled to an associated one of the upper 70 and lower 72 posts. Each of the arcuate support members 74 has a second end 78 coupled to a back side 76 of the rear advertising frame 66. Each of the upper 70 and lower 72 posts may have a length between approximately 20.0 centimeters and 40.0 centimeters. Each of the arcuate support members 74 may have a total length between approximately 50.0 centimeters and 90.0 centimeters. A bell 80 is coupled to the advertising support assembly 68. In particular, the bell 80 may be positioned on the lower post 72.

Figure 5:
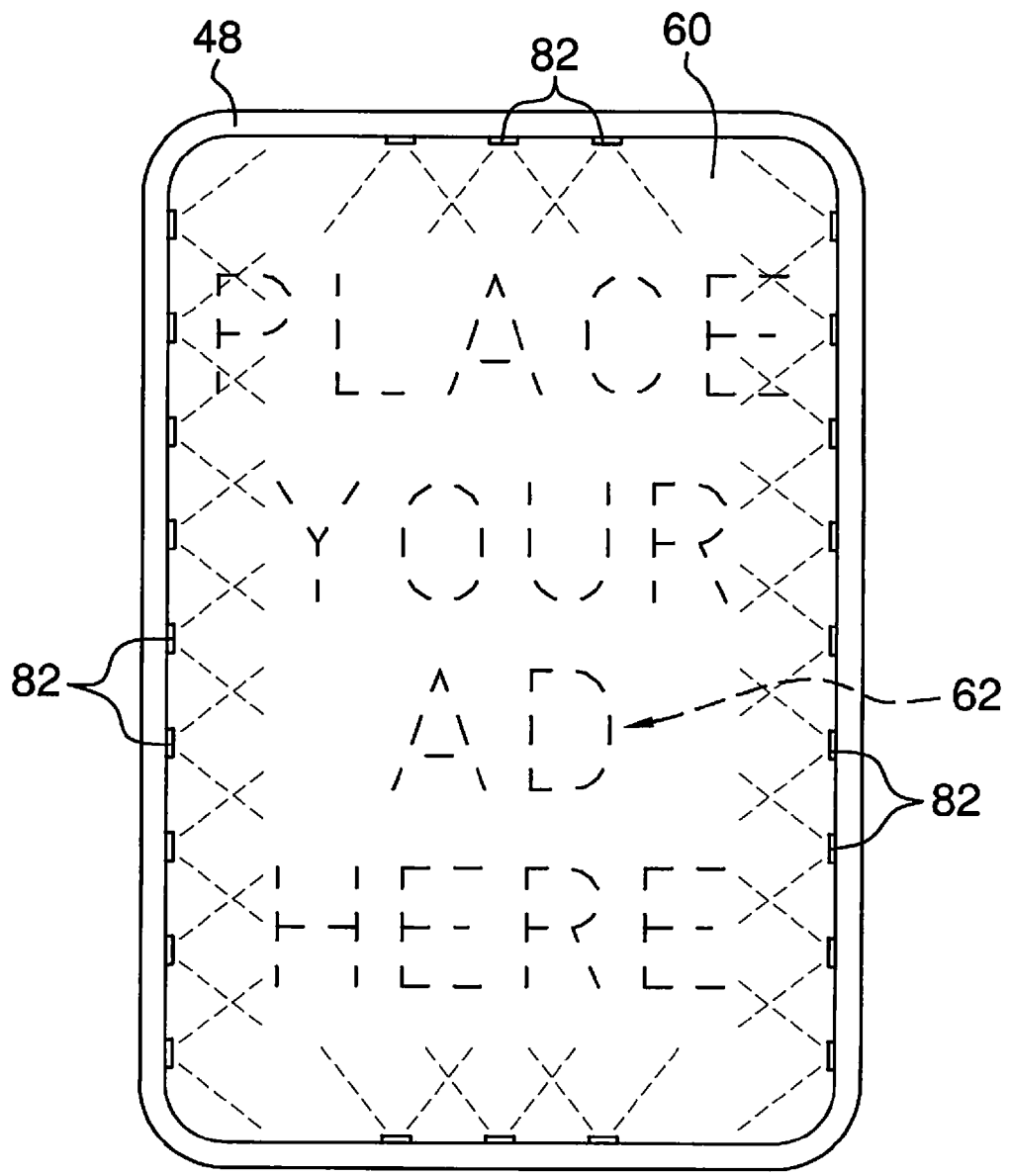
FIG. 5 is a front view of an alternative embodiment of the advertising frame disclosure having the panel attached thereto.

As shown in FIG. 5, an alternative embodiment of the device includes a plurality of lights 82 coupled to each of the advertising frames 64, 66. The lights 82 are directed toward the advertisement indicia 62 of the associated panel 60 when each associated panel 60 is coupled to the associated advertising frame 64, 66 wherein the lights 82 are selectively activated to illuminate the advertisement indicia 62.

A plurality of brackets 84 is coupled to each of the advertising frames 64, 66. A coupler 86 releasably couples an associated one of the panels 60 to each of the front 64 and rear 66 advertising frames. The coupler 86 comprises a plurality of first mating members 88 and a plurality of second mating members 90. Each of the first mating members 88 is coupled to an associated one of the brackets 84 of each of the front 64 and rear 66 advertising frames. Each of the second mating members 90 is coupled to an associated one of the panels 60. The first 88 and second 90 mating members are complementary relative to each other wherein each of the first mating members 88 is configured to releasably engage one of the second mating members 90 for releasably coupling the associated panel 60 to each of the front 64 and rear 66 advertising frames. The coupler 86 may comprise a hook and loop coupler, snaps or other conventional fasteners.

A head tube 92 is coupled to the front advertising frame 64 and to a front end 94 of the mid tube 18. A front fork 95 is coupled to and extends between the head tube 92 and the central hub 23 of the front wheel 22. A support post 96 is coupled to and extends upwardly from the head tube 92. A clamp 98 couples the front advertising frame 64 to the support post 96. A handlebar stem 100 is coupled to a back surface 102 of the front advertising frame 64. A pair of handlebars 104 is coupled to and extends downwardly from the handlebar stem 100.

In use, as stated above and shown in the Figures, one of the panels 60 is coupled to the front advertising frame 64 and one of the panels 60 is coupled to the rear advertising frame 66. The user then rides the device 10 in a conventional manner by sitting on the seat 42, grasping onto the handlebars 102, and rotating the pedals 28 with the user's feet. However, the advertisement indicia 62 provides advertisements to the public while the user rides the device 10.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. An advertising cycling device comprising:
   a cycling frame, said cycling frame including a top tube, a down tube and a mid tube, said top tube being coupled to and extending upwardly away from said mid tube, said down tube being coupled to and extending downwardly away from said mid tube;
   a plurality of wheels rotatably coupled to said cycling frame;
   a crankset coupled to said cycling frame, said crankset including a pair of pedals, said pedals being mechanically coupled to at least one of said wheels such that rotation of said pedals causes said at least one of said wheels to rotate;
   an advertising frame coupled to said cycling frame;
   a panel being selectively couplable to said advertising frame, said panel having advertisement indicia positioned thereon;
   a seat tube coupled to and extending upwardly from said mid tube, a distal end of said top tube with respect to said mid tube being coupled to said seat tube; and
   a seat coupled to a top end of said seat tube.

2. The device of claim 1, further comprising:
   said advertising frame including a top section, a bottom section and a pair of side sections coupled to and extending between said top section and said bottom section;
   an inner perimeter edge of said advertising frame defining a central opening positioned in said advertising frame; and
   said panel being positionable within said opening to cover said opening.

3. The device of claim 2, further comprising a plurality of lights coupled to said advertising frame, said lights being directed toward said advertisement indicia when said panel is coupled to said advertising frame wherein said lights are selectively activated to illuminate said advertisement indicia.

4. The device of claim 2, further comprising:
   a plurality of brackets coupled to said advertising frame; and
   a coupler releasably coupling said panel to said advertising frame, said coupler comprising a plurality of first mating members and a plurality of second mating members, each of said first mating members being coupled to an associated one of said brackets, each of said second mating members being coupled to said panel, said first mating members being complementary relative to said second mating members wherein each of said first mating members is configured to releasably engage one of said second mating members for releasably coupling said panel and said advertising frame.

5. The device of claim 4, wherein said coupler comprises a hook and loop coupler.

6. The device of claim 1, further comprising said plurality of wheels comprising exactly three wheels wherein said plurality of wheels includes a front wheel and a pair of rear wheels.

7. The device of claim 6, further comprising:
   said advertising frame being one of a pair of said advertising frames, said pair of advertising frames including a front advertising frame positioned above said front wheel and a rear advertising frame positioned above said rear wheels; and
   said panel being one of a pair of said panels, one of said panels being selectively couplable to said front advertising frame, one of said panels being selectively couplable to said rear advertising frame, each of said panels having advertisement indicia positioned thereon, each said panel being positionable within an associated one of said openings to cover said associated opening.

8. The device of claim 7, further comprising:

said cycling frame including a top tube, a down tube and a mid tube, said top tube being coupled to and extending upwardly away from said mid tube, said down tube being coupled to and extending downwardly away from said mid tube;

a seat tube coupled to and extending upwardly from said mid tube, a distal end of said top tube with respect to said mid tube being coupled to said seat tube;

a seat coupled to a top end of said seat tube; and an advertising support assembly coupling said seat tube to said rear advertising frame.

9. The device of claim 8, further comprising said advertising support assembly comprising:

an upper post and a lower post, each of said upper and lower posts being coupled to and extending rearwardly from said seat tube, said upper and lower posts being positioned in spaced parallel relationship relative to each other; and a pair of arcuate support members, each of said arcuate support members having a first end coupled to an associated one of said upper and lower posts, each of said arcuate support members having a second end coupled to a back side of said rear advertising frame.

10. The device of claim 8, further comprising a bell coupled to said advertising support assembly.

11. The device of claim 1, further comprising:

said plurality of wheels including a pair of rear wheels; and a chain coupled to said crankset, said chain being mechanically coupled to each of said rear wheels such that rotation of said chain about said crankset causes said rear wheels to rotate.

12. The device of claim 1, further comprising a plurality of fenders, each of said fenders being coupled to an associated one of said wheels.

13. The device of claim 12, further comprising said plurality of wheels including a front wheel and a pair of rear wheels, each of said fenders of said rear wheels having a safety reflector positioned thereon, each of said safety reflectors being positioned proximate a back end of said associated fender.

14. The device of claim 1, further comprising a height-adjustable tube coupled to said seat tube, said height-adjustable tube being positioned within an interior of said seat tube and being coupled to said seat, said height-adjustable tube being configured to permit adjustment of a height of said seat relative to said seat tube.

15. An advertising cycling device comprising:

a cycling frame, said cycling frame including a top tube, a down tube and a mid tube, said top tube being coupled to and extending upwardly away from said mid tube, said down tube being coupled to and extending downwardly away from said mid tube;

a plurality of wheels rotatably coupled to said cycling frame;

a crankset coupled to said cycling frame, said crankset including a pair of pedals, said pedals being mechanically coupled to at least one of said wheels such that rotation of said pedals causes said at least one of said wheels to rotate;

an advertising frame coupled to said cycling frame;

a panel being selectively couplable to said advertising frame, said panel having advertisement indicia positioned thereon;

said plurality of wheels including a front wheel;

a head tube coupled to a front end of said mid tube;

a front fork is coupled to and extending between said head tube and a central hub of said front wheel; and a support post coupled to and extending upwardly from said head tube, said head tube being coupled to said advertising frame.

16. The device of claim 15, further comprising a clamp coupling said advertising frame to said support post.

17. An advertising cycling device comprising:

a cycling frame;

a plurality of wheels rotatably coupled to said cycling frame;

a crankset coupled to said cycling frame, said crankset including a pair of pedals, said pedals being mechanically coupled to at least one of said wheels such that rotation of said pedals causes said at least one of said wheels to rotate;

an advertising frame coupled to said cycling frame;

a panel being selectively couplable to said advertising frame, said panel having advertisement indicia positioned thereon;

a handlebar stem coupled to a back surface of said advertising frame; and a pair of handlebars coupled to and extending downwardly from said handlebar stem.

18. The advertising cycling device of claim 17, further comprising:

said cycling frame including a top tube, a down tube and a mid tube, said top tube being coupled to and extending upwardly away from said mid tube, said down tube being coupled to and extending downwardly away from said mid tube;

said plurality of wheels comprising exactly three wheels wherein said plurality of wheels includes a front wheel and a pair of rear wheels;

said pedals being mechanically coupled to said rear wheels such that rotation of said pedals causes said rear wheels to rotate;

a chain coupled to said crankset, said chain being mechanically coupled to each of said rear wheels such that rotation of said chain about said crankset causes said rear wheels to rotate;

a seat tube coupled to and extending upwardly from said mid tube, a distal end of said top tube with respect to said mid tube being coupled to said seat tube;

a seat coupled to a top end of said seat tube;

a height-adjustable tube coupled to said seat tube, said height-adjustable tube being positioned within an interior of said seat tube and being coupled to said seat, said height-adjustable tube being configured to permit adjustment of a height of said seat relative to said seat tube;

said advertising frame including a top section, a bottom section and a pair of side sections coupled to and extending between said top section and said bottom section, an inner perimeter edge of said advertising frame defining a central opening positioned in said advertising frame, said advertising frame being one of a pair of said advertising frames wherein said pair of advertising frames includes a front advertising frame positioned above said front wheel and a rear advertising frame positioned above said rear wheels;

said panel being one of a pair of said panels, one of said panels being selectively couplable to said front advertising frame, one of said panels being selectively couplable to said rear advertising frame, each of said panels having advertisement indicia positioned thereon, each said panel being positionable within an associated one of said openings to cover said associated opening;

an advertising support assembly coupling said seat tube to said rear advertising frame, said advertising support assembly comprising an upper post, a lower post and a pair of arcuate support members, each of said upper and lower posts being coupled to and extending rearwardly from said seat tube, said upper and lower posts being positioned in spaced parallel relationship relative to each other, each of said arcuate support members having a first end coupled to an associated one of said upper and lower posts, each of said arcuate support members having a second end coupled to a back side of said rear advertising frame;

a bell coupled to said advertising support assembly, said bell being positioned on said lower post;

a plurality of lights being coupled to each of said advertising frames, said lights of each said advertising frame being directed toward said advertisement indicia of said associated panel when each said associated panel is coupled to said associated advertising frame wherein said lights are selectively activated to illuminate said advertisement indicia;

a plurality of brackets coupled to each of said advertising frames;

a coupler releasably coupling an associated one of said panels to each of said front and rear advertising frames, said coupler comprising a plurality of first mating members and a plurality of second mating members, each of said first mating members being coupled to an associated one of said brackets of each of said front and rear advertising frames, each of said second mating members being coupled to an associated one of said panels, said first and second mating members being complementary relative to each other wherein each of said first mating members is configured to releasably engage one of said second mating members for releasably coupling said associated panel to each of said front and rear advertising frames, said coupler comprising a hook and loop coupler;

a head tube coupled to a front end of said mid tube;

a front fork coupled to and extending between said head tube and a central hub of said front wheel;

a support post coupled to and extending upwardly from said head tube, said head tube being coupled to said front advertising frame;

a clamp coupling said front advertising frame to said support post;

a plurality of fenders, each of said fenders being coupled to an associated one of said wheels; and each of said fenders of said rear wheels having a safety reflector positioned thereon, each of said safety reflectors being positioned proximate a back end of said associated fender.

\* \* \* \* \*